United States Patent
Grubel et al.

(10) Patent No.: US 10,897,480 B2
(45) Date of Patent: Jan. 19, 2021

(54) MACHINE LEARNING DATA FILTERING IN A CROSS-DOMAIN ENVIRONMENT

(71) Applicant: The Boeing Company, Chicago, IL (US)

(72) Inventors: Brian C. Grubel, Vienna, VA (US); Raymond L. Ward, Arlington, VA (US)

(73) Assignee: THE BOEING COMPANY, Chicago, IL (US)

( * ) Notice: Subject to any disclaimer, the term of this patent is extended or adjusted under 35 U.S.C. 154(b) by 255 days.

(21) Appl. No.: 16/047,926

(22) Filed: Jul. 27, 2018

(65) Prior Publication Data
US 2020/0036732 A1    Jan. 30, 2020

(51) Int. Cl.
*H04L 29/06*  (2006.01)
*G06N 20/00*  (2019.01)

(52) U.S. Cl.
CPC ........... *H04L 63/145* (2013.01); *G06N 20/00* (2019.01); *H04L 63/0245* (2013.01)

(58) Field of Classification Search
CPC .... H04L 63/145; H04L 63/0245; G06N 20/00
See application file for complete search history.

(56) References Cited

U.S. PATENT DOCUMENTS

| | | | | |
|---|---|---|---|---|
| 9,959,407 B1* | 5/2018 | Li | ........................... | G06N 20/00 |
| 9,992,211 B1* | 6/2018 | Viljoen | ................... | G06F 21/56 |
| 10,250,617 B1* | 4/2019 | Gardner | ................. | G06F 16/285 |
| 10,366,233 B1* | 7/2019 | Feinman | ................. | G06N 5/003 |
| 10,484,399 B1* | 11/2019 | Curtin | .................. | H04L 63/1408 |
| 10,546,123 B1* | 1/2020 | Lan | .......................... | G06N 20/00 |
| 10,572,823 B1* | 2/2020 | Feinman | ................. | G06F 21/56 |
| 2010/0132037 A1* | 5/2010 | Ji | ........................... | G06F 21/554 726/22 |
| 2010/0192222 A1* | 7/2010 | Stokes | ................... | G06F 21/563 726/22 |
| 2014/0090061 A1 | 3/2014 | Avasarala et al. | | |
| 2015/0121524 A1* | 4/2015 | Fawaz | ................... | G06F 21/552 726/23 |
| 2016/0275288 A1* | 9/2016 | Sethumadhavan | ......................... | H04L 63/0428 |
| 2017/0026390 A1* | 1/2017 | Sofka | ..................... | G06N 20/00 |
| 2017/0032279 A1 | 2/2017 | Miserendino et al. | | |

(Continued)

OTHER PUBLICATIONS

Shafiq et al., "Embedded Malware Detection Using Markov n-Grams", DIMVA 2008, LNCS 5137, pp. 88-107 (Year: 2008).*

(Continued)

*Primary Examiner* — Hee K Song
(74) *Attorney, Agent, or Firm* — MH2 Technology Law Group LLP

(57) ABSTRACT

Techniques for transferring data from a first domain to a second domain in a cross-domain environment are presented. The techniques can include accepting computer readable data in the first domain for transfer to the second domain, passing the computer readable data to a first machine learning classifier at the first domain trained with at least malware files publicly identified as malicious, passing the computer readable data to a second machine learning classifier at the first domain trained with at least malware files specific to the first domain, and transferring the computer readable data to a destination in the second domain.

20 Claims, 5 Drawing Sheets

(56) References Cited

U.S. PATENT DOCUMENTS

| | | | |
|---|---|---|---|
| 2017/0236131 A1* | 8/2017 | Nathenson | G06Q 30/0631 |
| | | | 705/26.7 |
| 2017/0262633 A1* | 9/2017 | Miserendino | G06F 21/564 |
| 2018/0124085 A1* | 5/2018 | Frayman | H04L 12/2825 |
| 2019/0007433 A1* | 1/2019 | McLane | G06F 21/561 |
| 2019/0347423 A1* | 11/2019 | Sanossian | H04L 63/1433 |
| 2020/0004963 A1* | 1/2020 | Zheng | G06F 21/566 |
| 2020/0067861 A1* | 2/2020 | Leddy | H04L 51/12 |

OTHER PUBLICATIONS

Extended European Search Report dated Nov. 25, 2020 in corresponding European Application No. 19188139.0, 8 pages.

* cited by examiner

MACHINE LEARNING DATA FILTERING IN A CROSS-DOMAIN ENVIRONMENT

FIELD

This disclosure relates generally to transferring information between domains in a cross-domain solution environment.

BACKGROUND

Cross-domain Solutions are a form of controlled interface that provides the ability to manually and/or automatically access and/or transfer information between different security domains. See SANS Institute Reading Room, Shedding Light on Cross-domain Solutions, SANS Institute 2015. There are three basic types of cross-domain solutions: access, multi-level, and transfer. Access solutions describe a user's ability to view and manipulate information from domains of differing security levels and caveats. Multi-level access solutions use trusted labeling and integrated mandatory access control schema to parse data according to user credentials and clearance in order to authenticate read and write privileges. Transfer solutions provide the ability to move information between domains of differing security levels and caveats.

In particular, transfer cross-domain solutions are used to transfer mission-critical data between two or more security domains. Cross-domain solutions may inspect and sanitize data to defend against the passing of malicious or malformed content between domains. For example, cross-domain solutions can defend against the passing of malware, embedded/covert command and control communications, or data not otherwise allowed to be passed between domains. One technique commonly used for detection of malicious data is anti-virus signature-based detection, which compares the signature of a file (e.g., a hash) against a database of signatures of known-bad files. Should the file's signature not be contained within the database, the file will not be identified as malicious. Further, in the classified environments in which cross-domain solutions are typically deployed, the virus definition update cycles can be longer than desired, thus increasing the risk posture of the deployment and the mission's operation.

Supervised machine learning is a process that uses labeled examples to train a machine learning classifier to properly classify novel inputs. That is, a properly trained machine learning classifier can accept an input and classify it according to its training. Thus, supervised machine learning generally includes a training phase followed by a classification phase. During the training phase, the machine learning classifier is trained using a training corpus of training data that includes many (e.g., thousands) of inputs along with their classifications. The inputs may be vectors, for example, that include data representing an entity or thing to be classified. The classifications are typically binary, e.g., true/false, but can be tertiary or of wider discrimination ability. The classifications may be implemented as labels for the vectors, e.g., as discrete values (e.g., T, F) in a particular coordinate of the vectors. Thus, the training corpus can include many vectors, labeled according to their classification. Once the training phase is complete, many trained machine learning classifiers can not only output a classification for a novel input, but also provide probabilities of the classification being correct. Example machine learning classifier types include neural networks such as convolutional neural networks, support vector machines, and logistic regression.

SUMMARY

According to various embodiments, a method of transferring data from a first domain to a second domain in a cross-domain environment is presented. The method includes accepting computer readable data in the first domain for transfer to the second domain; passing the computer readable data to a first machine learning classifier at the first domain trained with at least malware files publicly identified as malicious; passing the computer readable data to a second machine learning classifier at the first domain trained with at least malware files specific to the first domain; and transferring the computer readable data to a destination in the second domain.

Various optional features of the above method embodiments include the following. The method may include passing the computer readable data to a third machine learning classifier at the second domain trained with at least malware files publicly identified as malicious; passing the computer readable data to a fourth machine learning classifier at the second domain trained with at least malware files specific to the second domain. The method may include passing the computer readable data to at least one filter configured to filter computer files based on at least one of: malware file signatures, sandbox behavior, metadata, or normalization. The malware files publicly identified as malicious may include files of malware used to generate signatures for a signature-based malware detection system. The malware publicly identified as malicious may include files with well formed formats. The malware files specific to the first domain may include malformed files. The malware specific to the first domain may include camera data. The camera data may include camera control data. The malware files specific to the first domain may include command and control data. The malware files specific to the first domain may include audio sensor data.

According to various embodiments, a computer system for transferring data from a first domain to a second domain in a cross-domain environment is presented. The system includes an interface at the first domain for accepting computer readable data in the first domain for transfer to the second domain; a first machine learning classifier at the first domain trained with at least malware files publicly identified as malicious; and a second machine learning classifier at the first domain trained with at least malware files specific to the first domain; where the interface is configured to accept computer readable data and pass it to at least the first machine learning classifier and the second machine learning classifier before passing the computer readable data to the second cross-domain environment.

Various optional features of the above system embodiments include the following. The system may include a third machine learning classifier at the second domain trained with at least malware files publicly identified as malicious; and a fourth machine learning classifier at the second domain trained with at least malware files specific to the second domain; where the system is configured to pass the computer readable data to at least the third machine learning classifier and to the fourth machine learning classifier in the second cross-domain environment. The system may include at least one filter communicatively coupled to receive the computer readable data and configured to filter computer files based on at least one of: malware file signatures, sandbox behavior, metadata, or normalization. The malware files publicly identified as malicious may include files of malware used to generate signatures for a signature-based malware detection system. The malware files publicly identified as malicious may include files with well formed formats. The malware files specific to the first domain may include malformed files. The malware files specific to the first domain may include camera data. The camera data may include camera control data. The malware files specific to the first domain may include command and control data. The malware specific to the first domain may include audio sensor data.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Cross-domain solutions in general, and transfer cross-domain solutions in particular, are combined hardware and computer-executable software systems used with two or more isolated security domains (also known as "enclaves") to transfer data securely between them by passing such data to one or more filters. Cross-domain solutions are intended to prevent the cross contamination of sensitive data not permitted between domains, prevent transmission of malicious content, and to prevent covert channels. However, as malware and covert channels become more sophisticated, known approaches used for filtering in cross-domain environments become less effective.

With the advent of artificial intelligence and machine learning, complex classifiers can be generated from the analysis of large amounts of labeled data, which can then be used to better identify malicious content that may not exactly match a signature according to common known-bad antivirus approaches. Thus, some embodiments provide a transfer cross-domain solution that utilizes a machine learning malicious content detection approach to filtering data. Some embodiments detect and filter not only malware, but also embedded content within well-formatted files. Embodiments are more effective than typical signature-based approaches and do not require as-frequent of an update cycle to maintain or reduce the risk posture of the solution. These and other advantages are explained in detail below.

Figure 1:
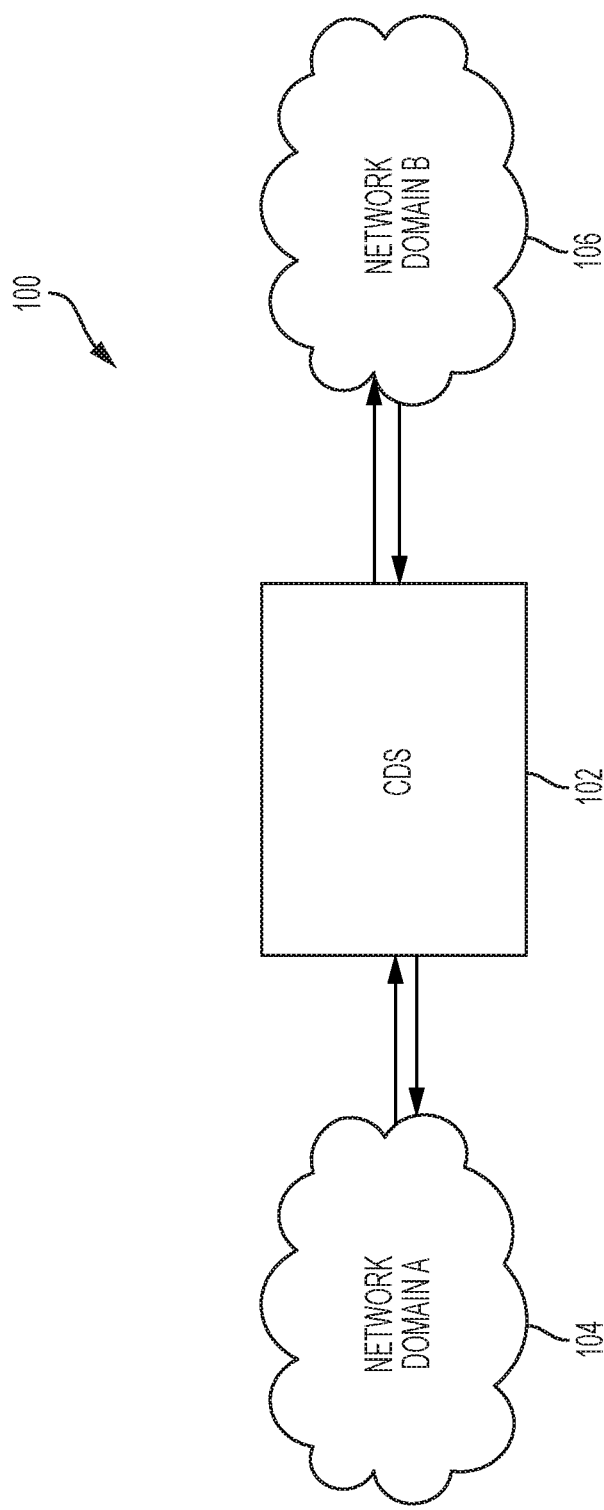
FIG. 1 is a high-level schematic diagram of a cross-domain solution system according to various embodiments.

FIG. 1 is a high-level schematic diagram of a cross-domain solution system 100 according to various embodiments. As shown, cross-domain solution 102 is interposed between security domain 104 and security domain 106. Cross-domain solution may be physically interposed between security domain 104 and security domain 106, e.g., using dedicated connection cables. Security domain 104 and security domain 106 may be implemented using separate physical hardware, or may be implemented in the same physical hardware. When implemented in the same physical hardware, the aforementioned cables would not necessarily apply. Each security domain 104, 106 may include a plurality of physical or virtual computers networked together, e.g., nodes. That is, each security domain 104, 106 may include an intranet. Within an intranet of each security domain 104, 106, nodes may communicate by way of peer links, which may not utilize the cross-domain filtering as described herein. The nodes may be implemented as distinct physical devices or they may be virtual nodes, e.g., existing on a hypervisor on the same physical hardware. Combinations of virtual and physical nodes are also possible. The nodes may connect to, or include, network assets on the respective intranet.

Between security domains 104, 106, filtering cross-domain solution 102 may implement any of a variety of existing filters in addition to those based on machine learning as described in detail herein. The filtering may be applied to sent files, received files, or both. A first type of filtering is based on a verification to check the received file type and format and compare it to what is expected, e.g., based on the file name extension. However, according to this first type of filtering, the file could be verified as correct, but still contain encrypted or embedded payloads. A second type of filtering is anti-virus scanning, using signature-based detection. However, according to this second type of filtering, a malicious payload could be encrypted (or otherwise polymorphic) such that a virus scan would not detect malicious content. Further, this second type of filtering utilizes frequent signature updates to improve security, and may not be effective at detection of zero day attacks. A third type of filtering is behavior-based detection, e.g., using a sandbox. According to this third type of filtering, a file is executed in a sandboxed environment and its behavior is observed. However, not all malicious files are executable, and thus the third type of filtering cannot be uniformly applied. A fourth type of filtering is normalization/sanitization, which uses the conversion from one file type to another and then back again to attempt to remove malware or embedded content. However, this fourth type of filtering may or may not address, e.g., zero day or other attacks.

Accordingly, embodiments may implement any, or any combination, of the first, second, third, and fourth types of filtering, in addition to filtering based on machine learning classifiers, as presented herein. Note that the usage of multiple distinct filters, with possibly overlapping filtering characteristics, provides both redundant and independent checking of the transferred data, both before it is transferred to a new domain, and after it is passes into the new domain.

Figure 2:
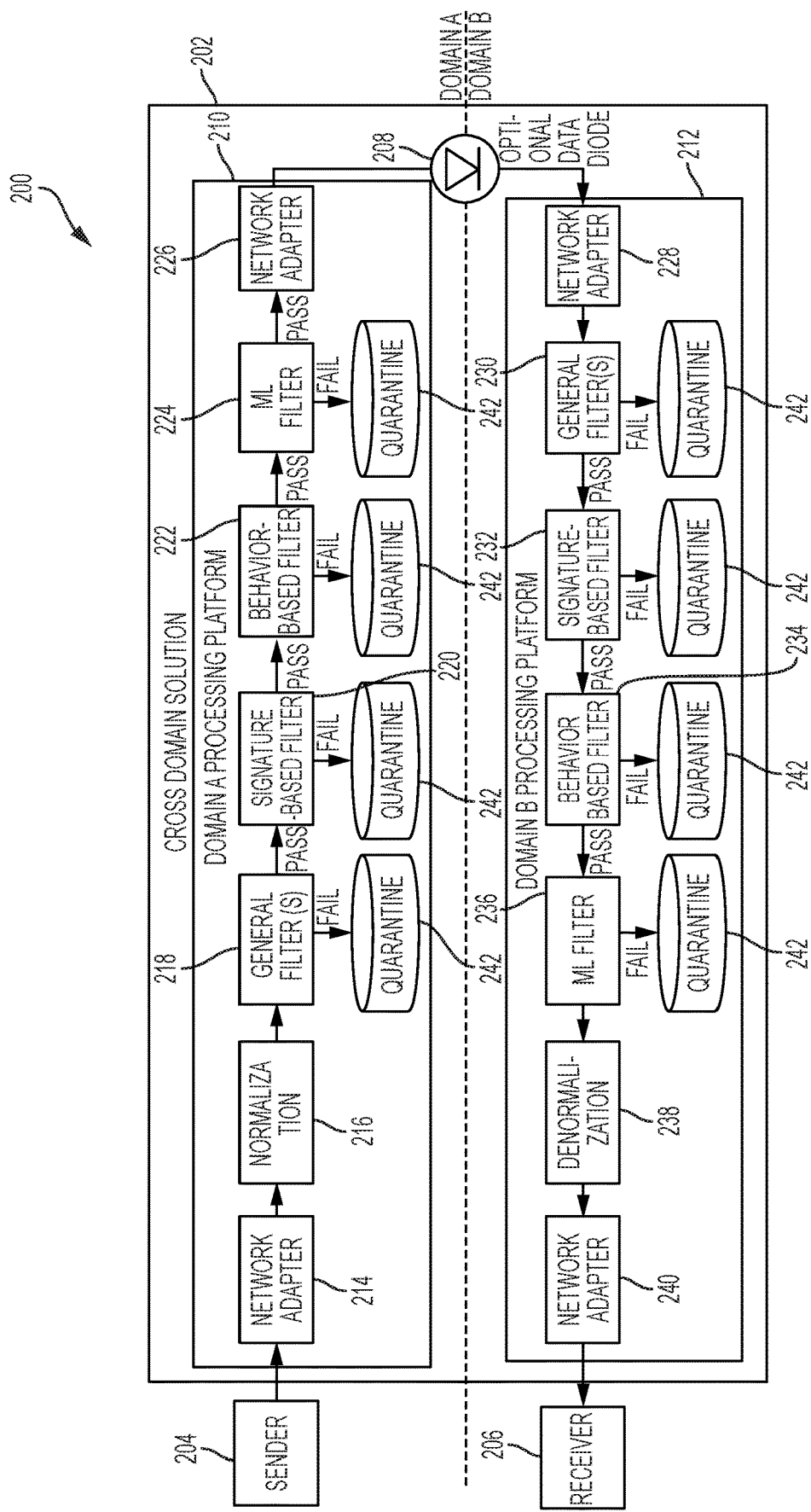
FIG. 2 is a schematic diagram of a cross-domain solution filtering system with two domains according to various embodiments.

FIG. 2 is a schematic diagram of a cross-domain solution filtering system 200 with two security domains according to various embodiments. The security domains, domain A and domain B, may be physically separate security domains, or logically separate security domains existing on the same physical hardware. For implementations where domain A and domain B at least partially exist on the same physical hardware, nodes 210, 212 may be implemented as sandboxes. For implementations where domain A and domain B at least partially exist on different physical hardware, nodes 210, 212 may be implemented as the respective physical hardware devices, e.g., workstations. The security domains may have differing security levels, e.g., differing government security levels such as unrestricted, confidential, secret, and top secret. Alternately, or in addition, the security domains may be separated according to any, or any combination, of being present at different organizations, differing in geographic location, having logical separation, or having physical separation.

The dotted line in FIG. 2 depicts the boundary between security domains. The security domains may be connected by a single communications channel, which may include one-way data diode 208 (e.g., an electro-optical coupled device) that permits data to pass from domain A to domain B, but not from domain B to domain A. Data diode 208 may be omitted, for example, in implementations where the domains at least partially exist on a single hardware unit. Note that the dotted line indicating the boundary between the security domains also passes through cross-domain solution 202, splitting sending side node 210 from receiving side node 212.

As shown, half of a complete system is depicted, namely, the portion for sending data from sender 204 to receiver 206. In implementations, a second, conjugate, half of the system performs essentially identical actions using essentially identical hardware and computer-executable software for sending data from receiver 206 to sender 204; that is, the labels "sender" and "receiver" refer to actions as described presently, rather than capabilities. Thus, the description of cross-domain solution filtering system 200 proceeds with the understanding that the description of the half depicted in FIG. 2 applies equally to the other half.

Sender 204 and receiver 206 may be any of a variety of entities. According to some embodiments, both sender 204 and receiver 206 are automated computers that engage in fully automated, machine-to-machine communications with little or no user in the loop. As an example of such machine-to-machine communication, according to such embodiments, a camera collecting full motion video data on one domain may stream that data to a storage mechanism in a different domain. According to other embodiments, sender 204 and receiver 206 are computers, such as workstations that, are operated by respective human users. According to such embodiments, for example, a user at sender 204 may drag a file for transfer into a folder that is constantly polled by cross-domain solution 202 to check for new data. Cross-domain solution 202 detects the file and transfers it across security domains.

Data sent from sender 204 to receiver 206 passes from sender 204 into cross-domain solution 202, where it undergoes filtering on both sides of the security domain boundary before being passed to receiver 206. In more detail, sender 204 may send data to receiver 206 through cross-domain solution 202, where it enters node 210, which may be a sandbox or physical computer, for example. Inside node 210, the data undergoes a series of filtering operations. Although presented in a specific order herein, the filtering operations may be implemented in any order. Further, any, and any combination of filtering operations may be utilized in addition to the machine learning based filtering disclosed herein.

As shown, the data is received by network adapter 214, which passes it to normalization filter 216. Network adapter 214, as well as network adapters 226, 228, and 240 facilitate communications by handling the protocol (e.g., unidirectional transfer control protocol, TCP) requirements for the transmission and reception of the data.

Normalization filter converts select file types into a different file type (and, possibly then back to the first file type). For example, normalization filter 216 may convert JPEG files to GIF files. The GIF files may be passed on, to be converted back to JPEG files by de-normalization filter 238. Alternately, normalization filter 216 may convert the GIF files back to JPEG files.

Next, the data is passed to various filters. The data enters general filter 218, which may filter based on criteria such as file size or other criteria. For example, a known-good file might have an expected value in a certain field. If the expected value is not present, the file would fail validation. In another embodiment, a field may be expected to contain a numerical value within a certain range, i.e. directional heading information. If the data fails the criteria, general filter 218 passes it to quarantine 242, which may be a repository that stores the data for human analysis. Otherwise, the data passes to signature-based filter 220. In signature-based filter 220, a signature, such as a cryptographic hash, is generated from the data. The signature is compared against a list of signatures from known malware. If a match is found, then the data is passed to quarantine 242. Otherwise, it is passed to behavior-based filter 222. Behavior-based filter 222 executes any executable file in the data in a sandbox environment using known techniques. If the execution procedure reveals that the file is likely malware, then it is passed to quarantine 242. Otherwise, it is passed to machine learning filter 224.

The construction, implementation, operation, and actions of machine learning filter 224 are described presently. Machine learning filter 224 may include multiple individual machine learning filters. According to some embodiments, machine learning filter 224 includes a base machine learning filter and a custom machine learning filter.

The base machine learning filter of machine learning filter 222 may be built using any of a variety of machine learning techniques including, by way of non-limiting example, neural networks such as convolutional neural networks, support vector machines, or logistic regression. The base machine learning filter of machine learning filter 222 may be trained with a training corpus of code (or compiled code, known-bad files, known-bad embedded files, etc.) from malware used to generate signatures for signature-based antivirus scanning techniques. In general, antivirus scanning techniques utilize a signature file of signatures (e.g., cryptographic hashes) of known malware. They compare signatures of various data present at a machine being scanned to the signatures, and if a match is found, then this indicates the presence of a virus. For the base machine learning filter of machine learning filter 222, the training corpus may include the actual code of the various viruses, as opposed to their signatures. In more detail, the code used to generate a malware signature file may be parsed to extract headers, function calls, objects, structures, etc. The headers, function calls, objects, structures, etc. may be vectorized using known techniques, labeled as malware, and included in the training corpus. Additionally, ordered lists of function calls may be vectorized, labeled as malware, and included in the training corpus. Known benign (i.e., non-malware) files may be vectorized, labeled as non-malware, and added to the corpus. The training corpus is then used to train a base machine learning classifier using known machine learning techniques. The base machine learning classifier is then included in a base machine learning filter, which, in operation, applies the base machine learning classifier to data and directs the data to either quarantine 242 or to the next stage in the process, depending on its classification.

Note that the base machine learning filter of machine learning filter 224 may detect malware that a signature-based anti-virus scanner would miss, even if the same malware files are used to generate both the signatures for the signature-based anti-virus scanner and the training corpus for the base machine learning filter. This is because the machine learning techniques recited herein go beyond exact matches to determine classification of novel data.

Machine learning filter 222 further includes one or more custom machine learning filters. Like the base machine learning filter, the custom machine learning filter may be built using any of a variety of machine learning techniques including, by way of non-limiting example, neural networks such as convolutional neural networks, support vector machines, or logistic regression.

The custom machine learning filter of machine learning filter 224 may be trained with a training corpus of malware files specific to domain A. In general, each domain may be associated with one or more particular hardware components, particular data types, and/or particular missions. Thus, malware files specific to the first domain may include malware files that can affect the particular hardware component(s), that are of, or interact with, the particular data type(s), and that can affect the particular mission(s) specific to the first domain. Examples can include the following.

Camera data, such as surveillance camera data, may be included in the training corpus for the custom machine learning filter. Such camera data may be image data collected and formatted by a camera, for example. The image data may be mal-formatted or otherwise adulterated, so as to provide malware functionality. Alternately, or in addition, such camera data may be camera control data, e.g., for pan-tilt-zoom (PTZ) cameras, such camera data may be camera position control data that alters a pan, tilt, and/or zoom position of the camera. Such control data may be intentionally corrupted to include malware or otherwise provide malware functionality.

More generally, the training corpus for the custom machine learning filter of machine learning filter 224 may include doctored command and control data for any of a variety of machines. For example, such data may include Industrial Control System (ICS) data, such as Supervisory Control and Data Acquisition (SCADA) data, or Distributed Control Systems (DCS) data. Either command or reporting data may be included. Data formatted to be sent to or from Programmable Logic Controllers (PLC) may also be included. In each case, the data may be adulterated to include malware or otherwise provide malware functionality.

Another type of data is that provided by, and sent to, audio sensors. Like for cameras, the data may be either data collected by the sensors or data that controls the sensors. Control data may include data that activates or deactivates the sensors. The audio sensor data used to train the custom machine learning filter of machine learning filter 224 may be corrupted to include malware or otherwise provide malware functionality.

Another type of data suitable for adding to the training corpus for the custom machine learning filter of machine learning filter 224 is email data. The email data may include email message data, or data from any layer used to send or receive an email message. The data may be intentionally changed to include malware or otherwise provide malware functionality.

Other types of data suitable for adding to the training corpus for the custom machine learning filter of machine learning filter 224 is intercepted data, e.g., Signal Intelligence (SIGINT) data such as Communications Intelligence (COMINT) or Electronic Intelligence (ELINT). SIGINT data refers to data intercepted from adversaries or potential adversaries; COMINT refers to such data that includes human communications, and ELINT refers to such data that does not include human communications, such as machine-to-machine data. SIGINT data may be collected from adversaries or suspected adversaries using any of a variety of techniques. For example, such data may be intercepted when being sent to or from a military asset such as a ship, boat, airplane, installation, or satellite. The data may have been doctored to include malware or otherwise provide malware functionality.

Another type of data suitable for adding to the training corpus for the custom machine learning filter of machine learning filter 224 is Measurement And Signature Intelligence (MASINT) data. MASINT data refers to data obtained from sensing instruments for the purpose of identifying any distinctive features associated with the source, emitter, or sender, to facilitate identification of the source, emitter, or sender. Such data may be RADAR data, either reflected from a target where the source is co-located or otherwise associated with the domain, or may be transmitted from the target so as to appear to be a reflection but in reality is actively transmitted from the target. Such data may be intentionally corrupted to include malware or otherwise provide malware functionality.

Another type of data suitable for adding to the training corpus for the custom machine learning filter of machine learning filter 224 is Geospatial Intelligence (GEOINT) data. GEOINT data refers to data that describes, assesses, or visually depicts physical features or geographically referenced activities on the Earth. GEOINT data can include geospatial data or georeferenced social media, and/or the data used to process, format, or otherwise utilize geospatial data or georeferenced social media. Such data may be intentionally corrupted to include malware or otherwise provide malware functionality.

Another type of data suitable for adding to the training corpus for the custom machine learning filter of machine learning filter 224 is Imagery Intelligence (IMINT) data. IMINT data refers to imagery data acquired by aircraft or satellite, for example. An adversary may simulate expected IMINT data, but insert malware that would be received by the IMINT recipient.

Each of SIGINT, ELINT, COMINT, GEOINT, and IMINT is associated with a mission. For example, SIGINT is associated with the mission of acquiring, analyzing, and acting on signal intelligence data, with sub-missions associated with COMINT and ELINT. GEOINT is associated with the mission of acquiring, analyzing, and acting on geospatial data. MASINT is associated with the mission of acquiring, analyzing, and acting on measurement and signature data. IMINT is associated with the mission of acquiring, analyzing, and acting on imagery data.

Yet further data types suitable for adding to the training corpus for the custom machine learning filter of machine learning filter 224 include the following: AMI, AOCO, Base64 Encoding, BZIP2, COT, CSV, GeoTIFF, GIF, GMTI, GZ, HDF, HTTP, ICMP, JAR, JPEG, Link16, Microsoft Office, MPEG, NITF, NTP, OTHGold, PDF, PNG, RTF, RTP, SHP, SkyNet, SMTP, SNMP, TAR, TFRD, TIFF, TLE, TXT, WAV, X-MIDAS, XML, XMPP, and ZIP. Any of these data types may be associated with a defined mission for usage in the training corpus as described herein.

Any of the various data types described herein may be associated with domain A, domain B, or the mission of either (or both) of domain A or domain B.

In addition to any, or any combination, of the above malware-containing (or malware-acting) training data, known benign data may be included in the training corpus. That is, known benign (i.e., non-malware) files of the same type as the above mission-focused data may be vectorized, labeled as non-malware and added to the training corpus. Like for the base machine learning classifier, the training corpus is then used to train a custom machine learning classifier using known machine learning techniques. The custom machine learning classifier is then included in a custom machine learning filter, which, in operation, applies the custom machine learning classifier to data and directs the data to either quarantine 242 or to the next stage in the process, depending on its classification.

Thus, data to be sent from sender 204 to receiver 206 is processed by machine learning filter 224. If any machine learning filter (e.g., the base machine learning filter or the custom machine learning filter) of machine learning filter 224 identifies the data as malware, machine learning filter 224 passes it to quarantine 242. Otherwise, the data is passed to network adapter 226 for transmission out of domain A and into domain B. The data may then pass through data diode 208, if present in a particular embodiment.

The data sent from sender 204 in domain A to receiver 206 in domain B within cross-domain solution 202 is received in domain B at network adapter 228, which passes it to a series of filters and modules conjugate to the filters and modules present in node 210. General filter 230 is similar to general filter 218. Signature-based filter 232 is similar to signature-based filter 220 and may utilize the same, or different, signature files for its detection. Behavior-based filter 234 is similar to behavior-based filter 222, and may utilize the same, or different, criteria for designating data as malware. De-normalization filter 238 may convert the data to a different file type and then back again, or it may convert a file type that normalization filter 216 converted the data into back to the original file type. Network adapter 240 processes the data for transfer to receiver 206.

Note that although filters 216, 218, 220, 222, 224, 230, 232, 234, 236, and 238 are depicted in a series arrangement, embodiments are not so limited. According to some embodiments, the filters may be arranged in parallel. In such arrangements, if one filter determines that the data should be quarantined, then the data is removed from the remainder of the process and quarantined. Parallel arrangements have a speed advantage over series arrangements according to some embodiments. Accordingly, some embodiments have arrangements of the filters that include both series and parallel portions.

Figure 3:
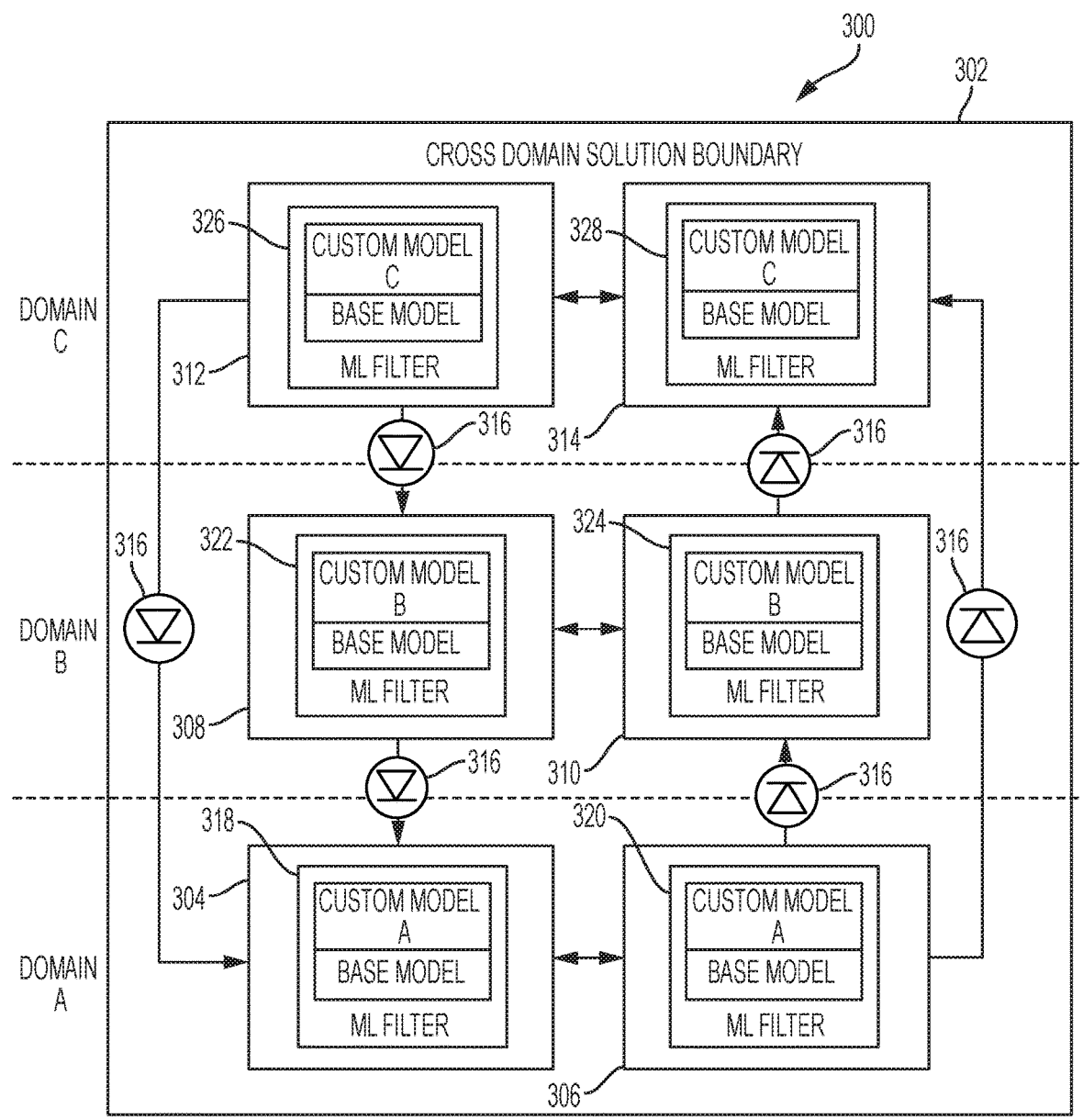
FIG. 3 is a schematic diagram of a cross-domain solution filtering system with three domains according to various embodiments.

FIG. 3 is a schematic diagram of a cross-domain solution filtering system 300 with three domains, domain A, domain B, and domain C, according to various embodiments. Cross-domain solution filtering system 300 includes cross-domain solution 302. Cross-domain solution 302 spans domain A, domain B, and domain C. Cross-domain solution 302 includes nodes 304, 306 in domain A, nodes 308, 310 in domain B, and nodes 312, 314 in domain C. As shown, directional communications between nodes 304, 306, 308, 310, 312, and 314 may be enforced by data diodes 316. Each node 304, 306, 308, 310, 312, and 314 may be implemented in dedicated hardware or virtually, where data diodes 316 may be omitted if virtual. Each node 304, 306, 308, 310, 312, and 314 may be communicatively coupled to one or more nodes or network resources in its respective domain.

Each node 304, 306, 308, 310, 312, and 314 includes a respective machine learning filter 318, 320, 322, 324, 326, and 328. Each machine learning filter 318, 320, 322, 324, 326, and 328 may be configured as described above in reference to machine learning filters 224, 236. Each machine learning filter 318, 320, 322, 324, 326, and 328 may include at least a base machine learning filter and a custom machine learning filter, configured as described above in reference to FIG. 2. Each base machine learning filter may be trained by a training corpus of data from malware files used for signature-based malware detection as described above. Each custom machine learning filter may be trained by a training corpus of data particular to its mission or security domain as described above. Each machine learning filter 318, 320, 322, 324, 326, and 328 may include one or more additional custom machine learning filters, as with machine learning filters 224 and 236.

According to some embodiments, domain C is a top secret domain, domain B is a secret domain, and domain A is an unclassified domain. Each respective node 304, 306, 308, 310, 312, and 314 in each respective domain may have a set of send and receive filters for each pipeline corresponding to a given data type. Nodes 312, 308, 304 on the left side of FIG. 3 are for moving data down (e.g., in terms of relative confidentiality) between domains and nodes 314, 310, and 306 on the right are for moving data up (e.g., in terms of relative confidentiality) between domains. The same set of filters can be used for both send and receive within a single node, however, FIG. 3 depicts one set of filters for ease of description, rather than limitation. Further, the same set of filters may be used to transfer data between the nodes within the same domain for a given node.

Figure 4:
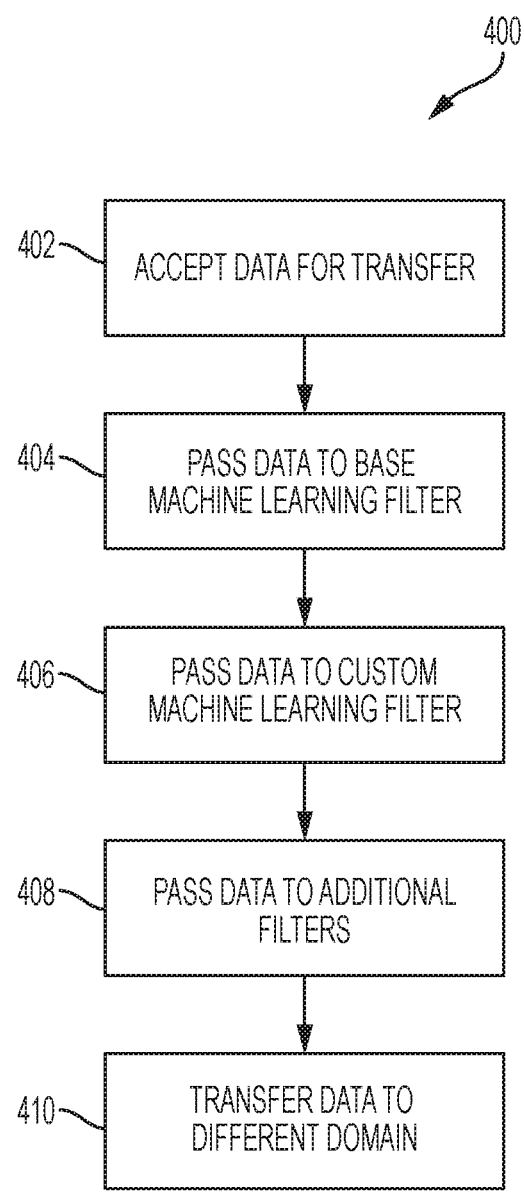
FIG. 4 is a flow diagram of a method of cross-domain solution filtering according to various embodiments.

FIG. 4 is a flow diagram of a method 400 of cross-domain solution filtering according to various embodiments. Method 400 may be implemented by any of nodes 210 or 212 of FIG. 2, or 304, 306, 308, 310, 312, or 314 of FIG. 3, using hardware as shown and described in reference to FIG. 5, below.

At block 412, method 400 accepts data for transfer from a first security domain to a second security domain. Such data may be accepted from a user-initiated process, e.g., a user dragging and dropping a file into a transfer folder, or from a machine-initiated process, e.g., camera command and control data.

At block 414, method 400 passes the data to a machine learning base filter, such as the machine learning base filters shown and described above in reference to FIGS. 2 and 3. The machine learning base filter operates to either pass or quarantine the data, as disclosed herein.

At block 416, method 400 passes the data to a machine learning custom filter, such as the machine learning custom filters shown and described above in reference to FIGS. 2 and 3. The machine learning custom filter operates to either pass or quarantine the data, as disclosed herein.

At block 418, method 400 passes the data to zero or more additional filters, such as normalization filter 216, general filter 218, signature-based filter 220, and/or behavior-based filter 222.

At block 420, method 400 transfers the data, having successfully passed through at least a base machine learning filter and a custom machine learning filter, to a conjugate cross-domain solution process in the destination security domain. At that point, the data may undergo a receiver-side filtering process, such as that shown and described above in reference to node 212 of FIG. 2.

Figure 5:
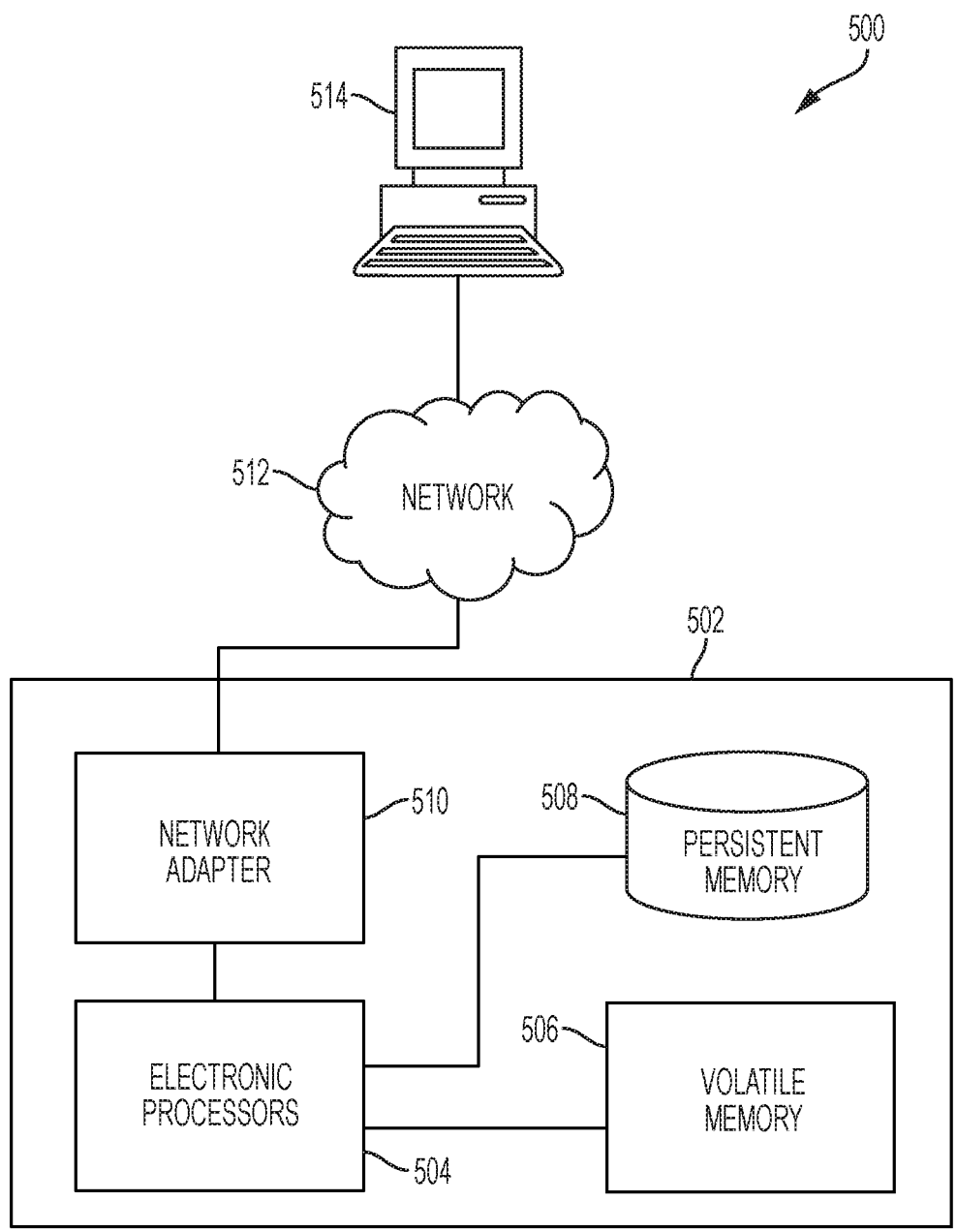
FIG. 5 is a schematic diagram of a computer system for cross-domain solution filtering according to various embodiments.

FIG. 5 is a schematic diagram of a computer system 500 for cross-domain solution filtering according to various embodiments. System 500 includes hardware execution platform 502, which itself includes processor 504. Processor 504, in concert with volatile memory 506, may be configured by computer-readable instructions stored in persistent memory 508 to perform any of the actions disclosed herein, including by way of non-limiting example, method 400 as shown and described above in reference to FIG. 4. Execution platform 502 may serve as a node in any embodiment described herein. Processors 504 and volatile memory 506 may execute such instructions directly, or indirectly, e.g., by simulating a hardware computing platform as disclosed herein. Hardware execution platform 502 includes network adapter 510, which may be different and separate from network adapters 214, 226, 240, or 228. Network adapter 510 serves to couple execution platform 502 to a network such as the internet or an intranet, and thereby to computer 514. Computer 514 may be in, or represent, a security domain different from a security domain that includes execution platform 502.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of transferring data from a first domain to a second domain in a cross-domain environment, wherein the first domain and the second domain comprise separate security domains, the method comprising:
    accepting computer readable data in the first domain for transfer to the second domain;
    passing the computer readable data to a first machine learning classifier at the first domain trained with at least malware files publicly identified as malicious;
    passing the computer readable data to a second machine learning classifier at the first domain trained with at least malware files specific to the first domain;
    transferring the computer readable data to a destination in the second domain;
    passing the computer readable data to a third machine learning classifier at the second domain trained with at least malware files publicly identified as malicious; and
    passing the computer readable data to a fourth machine learning classifier at the second domain trained with at least malware files specific to the second domain.

2. The method of claim 1, further comprising passing the computer readable data to at least one filter configured to filter computer files based on at least one of: malware file signatures, sandbox behavior, metadata, or normalization.

3. The method of claim 1, wherein the malware files publicly identified as malicious comprise files of malware used to generate signatures for a signature-based malware detection system.

4. The method of claim 1, wherein the malware publicly identified as malicious comprise files with well formed formats.

5. The method of claim 1, wherein the malware files specific to the first domain comprise malformed files.

6. The method of claim 1, wherein the malware specific to the first domain comprise camera data.

7. The method of claim 6, wherein the camera data comprises camera control data.

8. The method of claim 1, wherein the malware files specific to the first domain comprise command and control data.

9. The method of claim 1, wherein the malware files specific to the first domain comprise audio sensor data.

10. The method of claim 1, wherein the transferring the computer readable data to a destination in the second domain comprises transferring via a one-way data diode.

11. The method of claim 1, wherein the interface is configured to accept computer readable data and pass it to at least the first machine learning classifier and the second machine learning classifier before passing the computer readable data to the second cross-domain environment via a one-way data diode.

12. A computer system for transferring data from a first domain to a second domain in a cross-domain environment, wherein the first domain and the second domain comprise separate security domains, the system comprising:
    an interface at the first domain for accepting computer readable data in the first domain for transfer to the second domain;
    a first machine learning classifier at the first domain trained with at least malware files publicly identified as malicious;
    a second machine learning classifier at the first domain trained with at least malware files specific to the first domain;
    wherein the interface is configured to accept computer readable data and pass it to at least the first machine learning classifier and the second machine learning classifier before passing the computer readable data to the second cross-domain environment;
    a third machine learning classifier at the second domain trained with at least malware files publicly identified as malicious; and
    a fourth machine learning classifier at the second domain trained with at least malware files specific to the second domain;

wherein the system is configured to pass the computer readable data to at least the third machine learning classifier and to the fourth machine learning classifier in the second cross-domain environment.

13. The system of claim 12, further comprising at least one filter communicatively coupled to receive the computer readable data and configured to filter computer files based on at least one of: malware file signatures, sandbox behavior, metadata, or normalization.

14. The system of claim 12, wherein the malware files publicly identified as malicious comprise files of malware used to generate signatures for a signature-based malware detection system.

15. The system of claim 12, wherein the malware files publicly identified as malicious comprise files with well formed formats.

16. The system of claim 12, wherein the malware files specific to the first domain comprise malformed files.

17. The system of claim 12, wherein the malware files specific to the first domain comprise camera data.

18. The system of claim 17, wherein the camera data comprises camera control data.

19. The system of claim 12, wherein the malware files specific to the first domain comprise command and control data.

20. The system of claim 12, wherein the malware specific to the first domain comprise audio sensor data.

* * * * *